J. R. SCOTT.
CLUTCH.
APPLICATION FILED JUNE 10, 1909.

1,118,449.

Patented Nov. 24, 1914.
2 SHEETS—SHEET 1.

Witnesses
Edward S. Day
A. C. Richardson.

Inventor
Jacob R. Scott
by his attorneys
Phillips, Van Everen & Fish

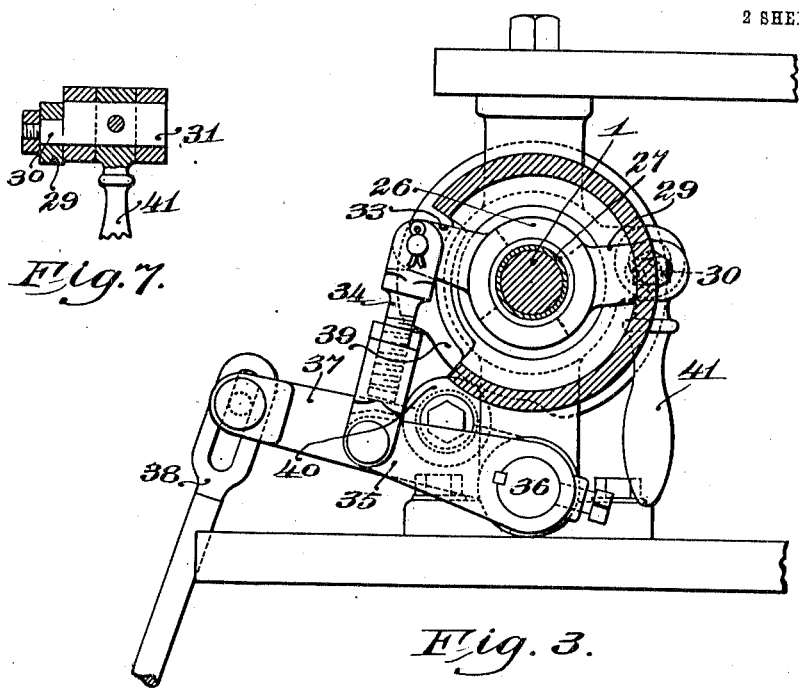
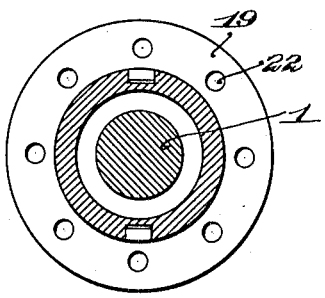
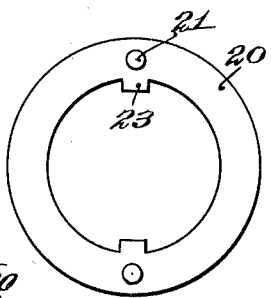
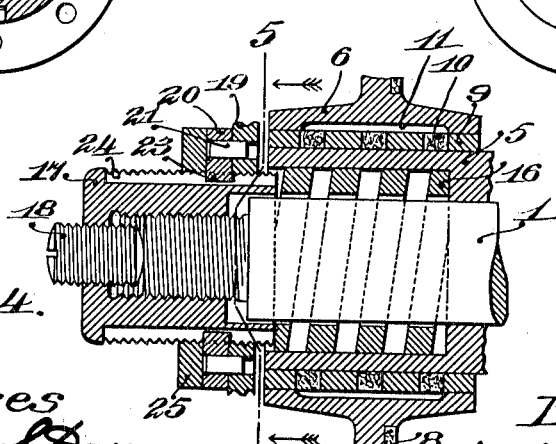

UNITED STATES PATENT OFFICE.

JACOB R. SCOTT, OF NORTH WEYMOUTH, MASSACHUSETTS, ASSIGNOR TO UNITED SHOE MACHINERY COMPANY, OF PATERSON, NEW JERSEY, A CORPORATION OF NEW JERSEY.

CLUTCH.

1,118,449.  Specification of Letters Patent.  Patented Nov. 24, 1914.

Application filed June 10, 1909. Serial No. 501,218.

*To all whom it may concern:*

Be it known that I, JACOB R. SCOTT, a citizen of the United States, residing at North Weymouth, in the county of Norfolk and State of Massachusetts, have invented certain new and useful Improvements in Clutches; and I do hereby declare the following to be a full, clear, and exact description of the invention, such as will enable others skilled in the art to which it appertains to make and use the same.

The present invention relates to clutches, and more particularly to that type of clutch which embodies a braking mechanism whereby when the clutch is disconnected a brake may be applied to the driven member.

One of the objects of the present invention is to devise a clutch of the above type which shall be simple in construction and certain in operation, and which will automatically throw the braking mechanism into operation at a predetermined point in the cycle of operations of the driven mechanism.

Another object is to provide a clutch with means whereby the closing of the clutch may be prevented when the braking mechanism is rendered inoperative.

With these and other objects in view, the present invention consists in the mechanisms and combinations of mechanisms hereinafter described and more particularly defined in the claims.

In the accompanying drawings the invention is illustrated as embodied in a form of mechanism especially designed for use on sewing machines, the specific form of mechanism, except for certain particulars which will be hereinafter referred to, being that shown and described in my pending application on a shoe sewing machine filed December 5th, 1907, Serial No. 405,235. My improved clutch, however, is not limited to use in connection with shoe sewing machines, but is adapted for use with other machines and mechanisms, not only in the specific form illustrated, but also in other embodiments and modifications obvious to those skilled in the art.

Figure 1:
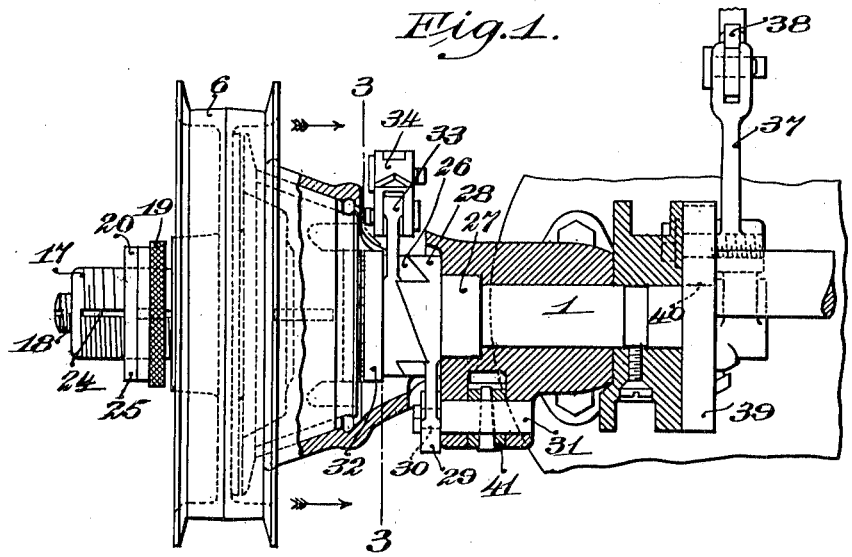
Figure 2:
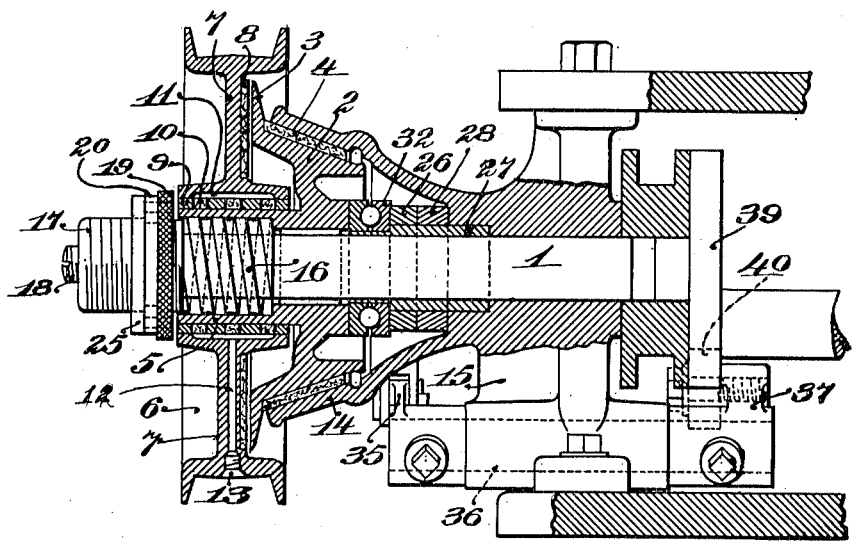

In the drawings Figure 1 shows my improved clutch in top plan view with portions in section; Fig. 2 is a vertical longitudinal sectional view; Fig. 3 is a transverse section on line 3—3, Fig. 1, looking toward the right; Fig. 4 is a vertical longitudinal section on an enlarged scale of the end of the driven shaft and of the parts adjacent thereto; Fig. 5 is a vertical section on lines 5—5, Fig. 4, looking toward the left; Fig. 6 shows in end elevation the locking ring for the thrust bearing for the loose pulley; and Fig. 7 is a detail in vertical section of a portion of the mechanism for rendering the clutch inoperative.

The clutch shown in the drawings comprises briefly a constantly rotating driving member, a clutch member operatively connected with the shaft of the machine or mechanism to be driven and longitudinally movable thereon, a fixed braking member, a rotatable cam for moving the clutch member in one direction along the shaft and into engagement with the driving member to close the clutch, a spring for moving the clutch member in the opposite direction to open the clutch and into engagement with the braking member, a rotatable cam fixed upon the shaft to prevent the spring from moving the clutch member into engagement with the braking member except at a predetermined point in the rotation of the shaft, and means under control of the operator for preventing the clutch from being closed when the clutch member is moved out of engagement with the brake member.

Splined upon the shaft 1 of the machine so as to rotate therewith, but movable longitudinally thereon, is the clutch member 2 having the radial clutch surface 3 and the inclined braking surface 4, the latter being provided with a facing of leather or other suitable material. Rotatably mounted upon the extended hub 5 of the clutch member is the constantly rotating driving pulley 6, the web 7 of which is provided with a lining or facing of leather 8, forming a clutch surface adapted to be engaged by the clutch surface 3 on the clutch member 2. In order to insure lubrication of the constantly rotating driving member, the bushing 9 in the hub of the latter is provided with radial holes or apertures in which are located pieces of felt 10 or other suitable material, to feed oil from an oil chamber 11 within the hub 5, the chamber being supplied with oil through the oil passage 12, the outer end of which is normally closed by the screw 13.

The fixed braking member comprises the conical braking surface 14 which extends from the frame 15 of the machine and is adapted to be engaged by the leather face of the braking surface on the clutch member when the latter is moved to the right in Figs. 1 and 2. The spring for moving the clutch member in this direction is shown at 16, encircling the shaft 1 near its end and located beneath the extended hub 5 of the clutch member. One end of the spring engages a shoulder on the inside of this hub, while the other end is in contact with an adjusting nut 17 adjustably mounted upon the threaded reduced end of the shaft, being secured in its adjusted position by the set screw 18. This adjusting nut also carries the thrust bearing for the constantly rotating driving member, against which bearing said member is pressed by the clutch member when the clutch is closed. This thrust bearing is in the form of a ring 19 screw-threaded upon its inner surface and adjustably mounted upon the correspondingly threaded outer surface of the adjusting nut. In order to secure the thrust bearing ring in its desired position, a locking ring 20 is provided having the pins 21, which are adapted to enter one or another of the pairs of diametrically opposed holes 22 in the thrust bearing ring, the locking ring being held from rotation by projections 23 located in the longitudinal slots or grooves 24 in the adjusting nut. A clamping nut 25 clamps the locking ring firmly against the thrust bearing ring and secures the latter in its adjusted position.

The clutch member is moved to the left in Figs. 1 and 2 to bring the clutch surface on said member into engagement with the clutch surface on the driving member and thus to close the clutch by mechanism actuated by the operator. This mechanism comprises a clutch actuating collar 26 rotatably and slidingly mounted upon a sleeve or bushing 27 surrounding the shaft and fixedly secured in the frame of the machine. This clutch actuating collar is provided with inclined cam surfaces on its edge which are arranged to engage and coöperate with oppositely inclined cam surfaces on another collar 28 also mounted upon the fixed bushing 27 and held from longitudinal movement thereon by engagement with a shoulder on the frame of the machine and normally prevented from rotation by the arm 29 projecting from said collar 28 and connected to the eccentric or crank pin 30 on the short shaft or stud 31 mounted in the frame of the machine. A ball thrust bearing 32, also mounted upon the fixed bushing 27, is interposed between the clutch actuating collar 26 and the hub of the clutch member. When the clutch actuating collar is rotated upon the bushing, the coöperating inclined cams upon said collar and the normally fixed collar 28 will cause the former to move longitudinally of the shaft and to force the clutch member into engagement with the driving member. The mechanism shown for rotating the actuating collar comprises an arm 33 projecting from said collar and extending through a slot or aperture in the flange which supports the braking surface. The outer end of the arm 33 is connected by means of an adjustable link 34 with the end of lever 35 fixedly secured to one end of shaft 36 which is rotatably mounted in a bearing on the frame of the machine. To the other end of this shaft is secured an arm 37 adjustably connected to the slotted end of the rod 38 which is adapted to be actuated by some suitable treadle mechanism (not shown) such as is illustrated in my pending application above referred to. When the rod 38 is depressed by the operator, the clutch will be closed and the driven mechanism set in operation. When pressure upon the treadle is released, however, the spring 16 tends to force the clutch member to the right in Figs. 1 and 2, to open the clutch and to throw the braking mechanism into operation to stop the machine.

It is often desirable that machines which operate with a recurring cycle of movements shall always stop at a predetermined point in such cycle. Thus in sewing machines of the type disclosed in my pending application above referred to, it is of advantage that the machine always stop with the needle in its raised position, thus enabling the operator to remove one shoe and insert another without having first to turn the machine through a partial revolution. One of the features of the clutch which forms the subject-matter of the present invention is that it will cause the driven machine or mechanism to come to rest always at the same predetermined point in the cycle of its operations. This result is accomplished by means of a cam 39 fixed upon the shaft 1 of the machine to rotate therewith and a cam roll 40 mounted upon the arm 37 of the clutch actuating mechanism. As shown in Fig. 3, the high part of the cam 39 is circular for a little more than three-fourths of its peripheral length and is adapted to engage the cam roll 40 when the clutch treadle is released to limit the rising movement of the arm 37 so that the brake will not be applied until the low part of the cam is reached. Preferably the parts will be so adjusted that when the clutch is closed the high part of the cam will just engage the cam roll so that even if the operator relieves the pressure on the treadle at some point in the cycle of operation of the machine other than the predetermined point, the clutch will not immediately be disengaged but will remain closed until the low portion of the cam 39 reaches the cam roll 40, when the clutch will automatically be opened and the brake applied. Such an adjustment, however, is not essential, as ordinarily it is immaterial whether the clutch be held closed until the low part of the cam is reached or be permitted immediately to open when the treadle is released, the momentum of the driven machine being relied upon to continue the rotation of the shaft until the brake is applied. The low portion of the cam, it will be observed, is of some substantial length so that some slipping between the two braking surfaces may be permitted and the machine may be brought to rest without excessive shock.

Another feature of the present invention is the provision of mechanism to prevent the clutch from being closed when the brake is relieved, thus enabling the operator to turn the machine over freely by hand for the purpose of adjustment or to observe its operation, without liability of accidentally closing the clutch. This result is accomplished in the clutch shown in the drawings by rotating the normally fixed collar 28 sufficiently upon the fixed bushing so that when the clutch actuating collar 26 is rotated to the limit of its movement, the longitudinal movement of such collar while sufficient to separate the braking surfaces on the clutch and brake members, is nevertheless not enough to bring the clutch surfaces of the clutch and driving members into engagement. This partial rotation of the normally fixed collar is effected through the arm 29 of said collar, a half rotation of the stud 31 moving the eccentric or crank pin 30 from the position shown in Fig. 7 to a position diametrically opposite. A handle 41 pinned upon the stud 31 affords a convenient means for rotating the stud, the position of the handle whether down, as shown in Fig. 3, or up, indicating to the operator at once whether a depression of the treadle will close the clutch or will simply release the brake.

While my improved clutch is in general identical with that shown and described in my pending application above referred to, it will be observed that the mechanism for adjusting the compression of the braking spring is somewhat different. In my said pending application the thrust bearing for the constantly rotating driving member is not adjustable independently of the braking spring so that any movement of the nut to vary or adjust the spring will necessarily effect a corresponding movement of the thrust bearing. Only a very small extent of adjustment, therefore, of the spring can be made without rendering the end play of the constantly rotating driving member either insufficient or excessive. Inasmuch as the braking spring is alone relied upon to stop the machine at the same point in its cycle of operation, it is essential that the compression of these springs may be adjusted to apply the requisite braking force, irrespective of variations in the strength of the springs, resulting either from manufacture or produced by use and wear.

The nature and scope of the present invention having been indicated, and what is now considered the preferred form having been specifically described, what is claimed is:

1. A clutch, having, in combination, a shaft, a clutch member operatively connected with the shaft and longitudinally movable thereon, and provided with clutch and braking surfaces, a driving member having a clutch surface, a stationary member having a braking surface, means for moving the clutch member in one direction to bring the clutch surfaces into engagement and in the other direction to bring the braking surfaces into engagement, and means under control of the operator for limiting the extent of movement of the clutch member to prevent the clutch surfaces from engaging when the clutch member is moved to disengage the braking surfaces, substantially as described.

2. A clutch, having, in combination, a shaft, a clutch member operatively connected to said shaft and longitudinally movable thereon and provided with clutch and braking surfaces, a driving member provided with a clutch surface and a stationary member provided with a braking surface arranged to coöperate respectively with the clutch and braking surfaces of the clutch member, means under the control of the operator for moving the clutch member in one direction to bring the clutch surfaces into engagement, a spring acting to move the clutch member in the opposite direction to bring the braking surfaces into engagement, and devices driven by the shaft for holding the clutch surfaces in engagement and for releasing the clutch member at a predetermined point in the rotation of the shaft to permit the braking surfaces to be brought into engagement substantially as described.

3. A clutch, having, in combination, a shaft, a clutch member operatively connected to said shaft and longitudinally movable thereon and provided with clutch and braking surfaces, a member provided with a clutch surface and a stationary member provided with a braking surface arranged to coöperate respectively with the clutch and braking surfaces of the clutch member, means under the control of the operator for moving the clutch member in one direction to bring the clutch surfaces into engagement, a spring acting to move the clutch member in the opposite direction to bring the braking surfaces into engagement, and devices driven by the shaft for preventing the braking surfaces from being brought into engagement except at a predetermined point in the rotation of the shaft substantially as described.

4. A clutch, having, in combination, a shaft, a clutch member operatively connected to said shaft and longitudinally movable thereon, and provided with clutch and braking surfaces, a driving member provided with a clutch surface and a stationary member provided with a braking surface arranged to coöperate respectively with the clutch and braking surfaces of the clutch member, a rotatable cam collar for moving the clutch member in one direction to bring the clutch surfaces into engagement, a spring for moving the clutch member in the opposite direction to bring the braking surfaces into engagement, means for rotating the collar, and a cam driven by the shaft acting on said means to prevent the collar from returning to the position from which it was rotated except at a predetermined point in the rotation of the shaft substantially as described.

5. A clutch, having in combination, a shaft, a clutch member operatively connected to said shaft and longitudinally movable thereon and provided with clutching and braking surfaces, a driving member provided with a clutch surface and a stationary member provided with a braking surface arranged to coöperate respectively with the clutch and braking surfaces of the clutch member, a rotatable cam collar for moving the clutch member in one direction to bring the clutch surfaces into engagement, a spring for moving the clutch member in the opposite direction to bring the braking surfaces into engagement, means for rotating the collar, a second rotatable cam collar coöperating with the first collar, and means controlled by the operator for rotating the second collar to prevent the clutch surfaces from being brought into engagement when the clutch member is moved to separate the braking surfaces substantially as described.

6. A clutch, having, in combination, a shaft, a clutch member operatively connected to said shaft and longitudinally movable thereon and provided with clutch and braking surfaces, a continuously rotating member having a clutch surface and a stationary member having a braking surface arranged to coöperate respectively with the clutch and braking surfaces of the clutch member, means for moving the clutch member in one direction to bring the clutch surfaces into engagement, a spring for moving the clutch member in the opposite direction to bring the braking surfaces into engagement, a nut for adjusting the compression of the spring, and a thrust bearing for the continuously rotating member adjustably mounted on said nut substantially as described.

7. A clutch, having, in combination, a shaft, a clutch member operatively connected to said shaft and longitudinally movable thereon and provided with clutch and braking surfaces, a continuously rotating member having a clutch surface arranged to coöperate with the clutch surface on the clutch member, a stationary member having a braking surface arranged to coöperate with the braking surface on the clutch member, means for moving the clutch member in one direction to bring the clutch surfaces into engagement, a spring for moving the clutch member in the opposite direction to bring the braking surfaces into engagement, means for adjusting the compression of the spring to vary the pressure between the braking surfaces, an independently adjustable thrust bearing for the continuously rotating member, and a cam driven by the shaft arranged to prevent the braking surfaces from being brought into engagement except at a predetermined point in the rotation of the shaft substantially as described.

8. A clutch, having, in combination, a shaft, driving mechanism therefor, a clutch for connecting the shaft to the driving mechanism, a brake to stop the rotation of the shaft, a movable member arranged when moved progressively in one direction first to release the brake and then to close the clutch, a normally fixed member coöperating with the movable member, and means under the control of the operator for varying the position of the fixed member to limit the effective movement of the movable member to prevent the clutch from being closed when the movable member is actuated to release the brake, substantially as described.

9. A clutch, having, in combination, a shaft, a clutch member operatively connected to said shaft and longitudinally movable thereon and provided with a hub and with clutch and braking surfaces, a continuously rotating driving member mounted upon the hub of the clutch member and provided with a clutch surface, a stationary member provided with a braking surface, means for moving the clutch member in one direction to bring the clutch surfaces into engagement, a spring surrounding the shaft and located within the hub of the clutch member for moving said member in the opposite direction to bring the braking surfaces into engagement, means carried by the shaft for adjusting the compression of the spring, and a thrust bearing for the continuously rotating driving member, substantially as described.

10. A clutch, having, in combination, a shaft, a clutch member operatively connected to said shaft and longitudinally movable thereon, and provided with clutch and braking surfaces, a driving member provided with a clutch surface, and a stationary member provided with a braking surface arranged to coöperate respectively with the clutch and braking surfaces of the clutch member, means for moving said clutch member in one direction to release the brake and close the clutch, and devices adjustable by the operator to render said means inoperative to close the clutch when the clutch member is moved to release the brake, substantially as described.

In testimony whereof I affix my signature, in presence of two witnesses.

JACOB R. SCOTT.

Witnesses:
WARREN G. OGDEN,
ALFRED H. HILDRETH.